Dec. 8, 1964   A. J. DE PIETRO   3,159,914
METHOD AND APPARATUS FOR ASCERTAINING PARAMETERS FOR USE
IN DETERMINING THE CURVATURE OF CONDYLE PATHS
Filed Dec. 8, 1961   4 Sheets-Sheet 1
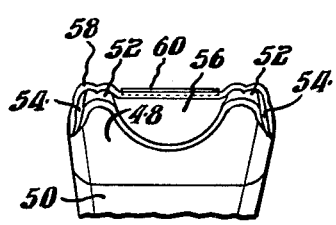
FIG_1_
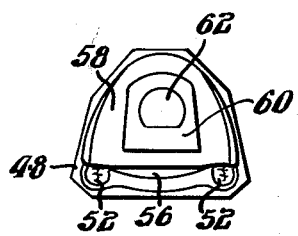
FIG_2_
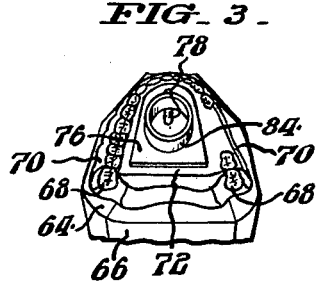
FIG_3_
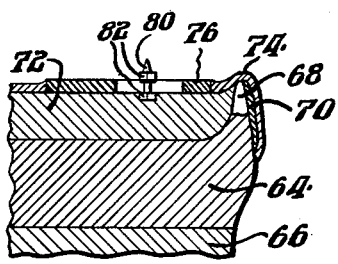
FIG_4_
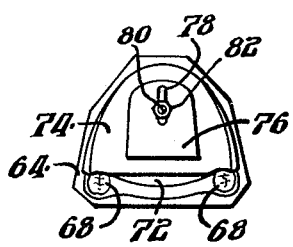
FIG_5_
INVENTOR.
Anthony J. DePietro,
BY
Paul & Paul
ATTORNEYS.

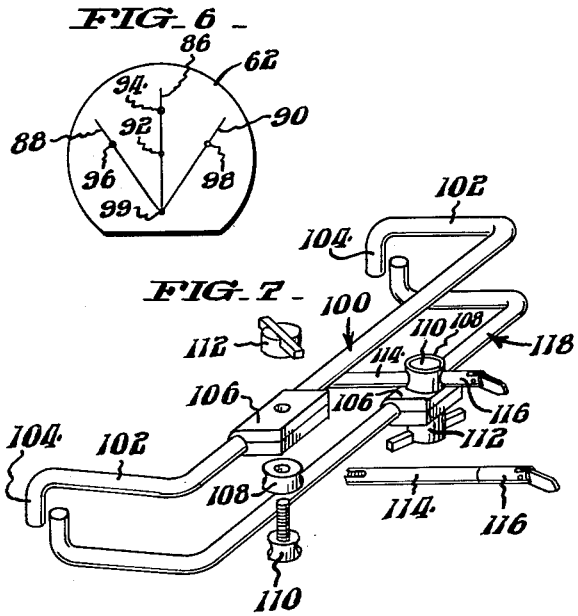
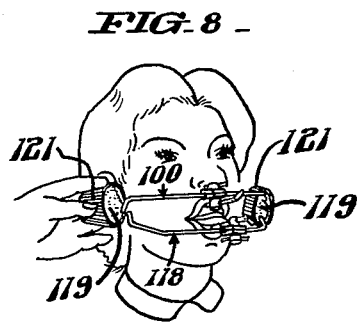
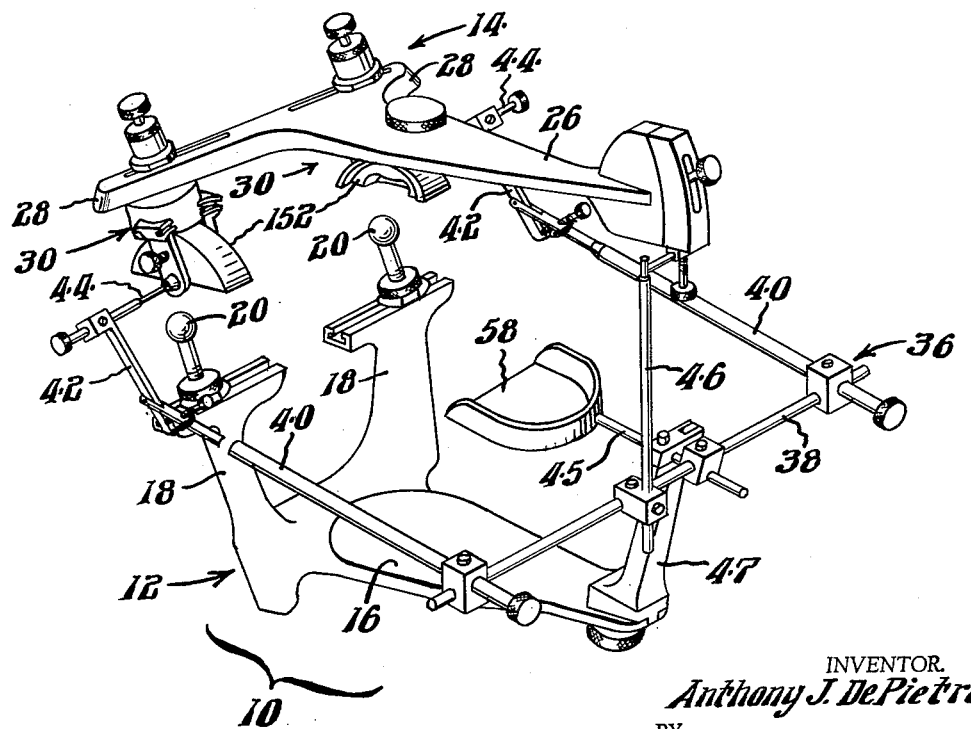

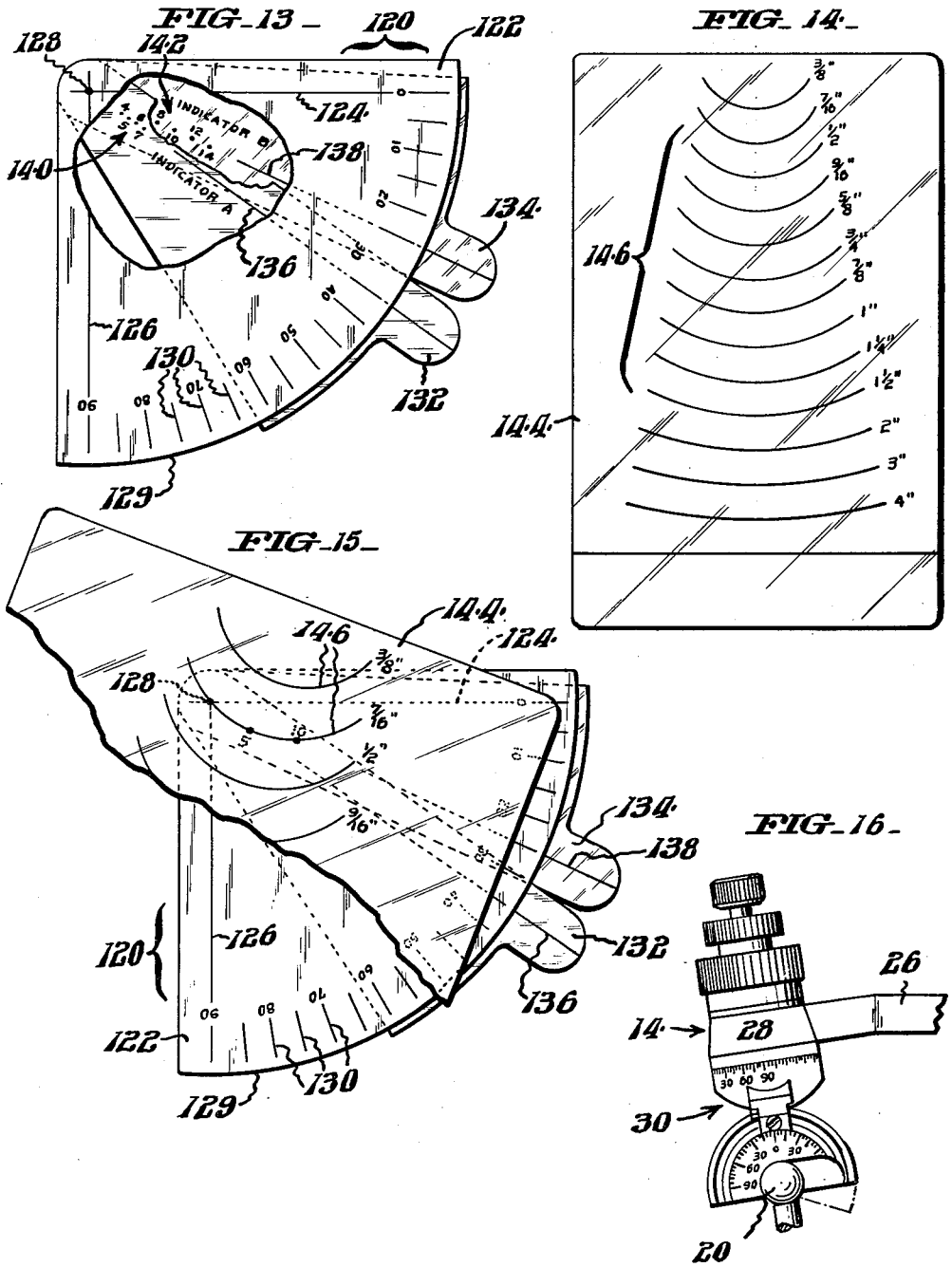

United States Patent Office 3,159,914
Patented Dec. 8, 1964

1

3,159,914
METHOD AND APPARATUS FOR ASCERTAINING PARAMETERS FOR USE IN DETERMINING THE CURVATURE OF CONDYLE PATHS
Anthony J. De Pietro, Springfield, Pa., assignor to Medical Electronics and Research Corporation, Camden, N.J., a corporation of New Jersey
Filed Dec. 8, 1961, Ser. No. 157,993
7 Claims. (Cl. 32—20)

This invention relates generally to means for use in dental prosthesis, and particularly to improvements in apparatus for and methods of fabricating artificial dentures.

In the masticating mechanism of the human being, the more or less rounded formations (the condyles) respectively carried by the two upstanding rearwardly disposed laterally spaced branches of the mandible articulate respectively in sockets (the glenoid fossae) in the skull at the rear of the cheek bones. Each glenoid fossae has a surface affording a condyle path, which path slopes more or less downwardly toward the incisors. Usually, the condyle path is curved, the radius of the curve being in the order of three-quarters of an inch. However, this radius may be more or less than three-quarters of an inch. It is even possible for the condyle path to be straight.

In the fabrication of artificial dentures, models of the upper and lower jaws are mounted in a dental articulator, which permits simulation of the various movements of which the patient is capable. To arrange and set the instrument properly, the radius of the condyle path in the instrument should correspond to the radius of the condyle path in the patient. The radius of the patient's condyle path may be obtained by means of a pantograph tracing. However, as is well known, the use of a pantograph is difficult and time consuming and is to be avoided, if possible. It is common, in lieu of a pantograph tracing, to simply assume that the radius of the condyle path in the patient is three-quarters of an inch, which is about average. Consequently, the condyle path in the instrument frequently does not correspond to that in the patient. Therefore, much is left to be desired in the way of accuracy in the arrangement and setting of the dental articulator. Accordingly, an important object of the present invention is to provide apparatus for and a simplified method of determining the radius of curvature of the condyle path in the patient to facilitate selection of the corresponding condyle path for use in the dental articulator.

The procedure of setting a dental articulator requires the use of several stone check bites. These are made in the patient's mouth, which is distasteful to the patient. In addition, it is inconvenient and time consuming for the operator to make stone check bites because it is difficult for him to see what he is doing. Furthermore, stone check bites require relationships to be taken with the patient's jaws a considerable distance apart, which is an unnatural condition. In the use of stone check bites, when the mandibular clutch tray is to be affixed to the lower section of the articulator, a stone bite is seated on the maxillary clutch tray and then the mandibular clutch tray is seated upon the stone check bite and manually held there while it is being affixed to the lower section of the articulator with stone. A very slight movement of the stone check bite and/or of the mandibular clutch tray results in appreciable error which in turn results in materially inferior work. Accordingly, other objects of the invention are to: avoid work in the patient's mouth by dispensing with the use of stone bite checks; make it possible for the operator to work in the clear, where he can see what he is doing; take registrations with the jaws in a more natural (closer) position; and provide means for holding the mandibular clutch tray fixed relative to the maxillary clutch tray while the former is being secured to the lower section of the articulator, without the errors which normally occur when the clutch trays are held together manually.

Other objects of the invention will become apparent when the following specification is read with reference to the accompanying drawings, in which:

FIG. 1 is a view looking at the back of a model of the upper jaw, showing a clutch tray formed thereover;

FIG. 2 is a plan view of the model and clutch tray shown in FIG. 1;

FIG. 3 is a perspective view looking at the back and top of a model of the lower jaw, showing a wax shim, bearing plate and spacer ring mounted thereon;

FIG. 4 is a longitudinal section through the model shown in FIG. 3, showing a clutch tray formed thereover and a stylus mounted on the bearing plate;

FIG. 5 is a plan view of the model and clutch tray shown in FIG. 4;

FIG. 6 is an enlarged view of a central bearing disc, shown in FIG. 2, showing protrusive and lateral registrations and depressions formed therein at predetermined points along the registrations;

FIG. 7 is a partially exploded perspective view of extra-oral bite-relationship apparatus;

FIG. 8 is a perspective view showing the extra-oral bite-relationship apparatus in the process of being applied to the patient;

FIG. 9 is a perspective view of a face bow mounted upon the lower section of an articulator and in turn mounting the upper section of the articulator;

FIG. 13 is a plan view of an indicator;

FIG. 14 is a plan view of a radius card;

FIG. 15 is a plan view of the radius card superimposed over the indicator; and

FIG. 16 is a side view of a hinge joint, showing in full lines the condyle disc set at zero angulation, and in broken lines the condyle disc adjusted, after use of the straight protrusive extra-oral bite-relationship apparatus.

Figure 10:
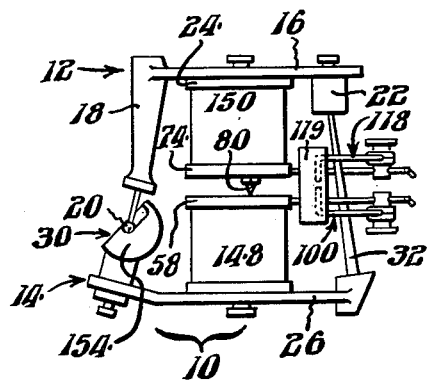
FIG. 10 is a diagrammatic side view of the articulator, showing the instrument turned upside down and the mandibular clutch tray positioned for securement to the lower section of the articulator through the medium of centric extra-oral bite-relationship apparatus.
Figure 11:
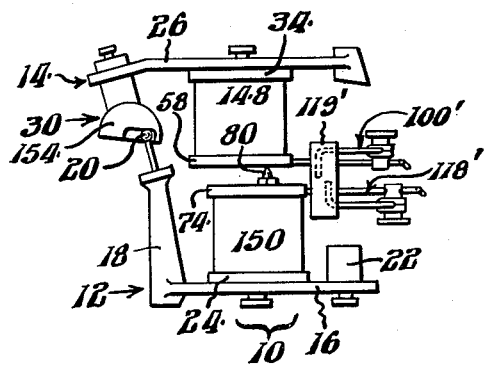
FIG. 11 is similar to FIG. 10, but shows the upper section of the articulator positioned relative to the lower section of the articulator through the medium of protrusive extra-oral bite-relationship apparatus.

Referring particularly to FIGS. 9, 10, and 11, the articulator, generally designated 10, comprises a lower bow member 12 and an upper bow member 14.

The lower bow member 12 comprises a main body 16 terminating at the rear thereof in a pair of laterally spaced upright posts 18 which mount condyle heads 20. Seated on the fore end of the member 12 is an incisal guide 22, and intermediate the guide 22 and the posts 18 is a plate 24 for mounting a stone model of the lower jaw.

The upper bow member 14 comprises a main body 26 terminating at the rear thereof in a pair of wings 28 extending laterally therefrom in opposite directions and mounting condylar assemblies 30. Mounted on the fore end of the member 14 is an incisal pin 32, and intermediate the pin 32 and the condylar assemblies 30 is a plate 34 for mounting a stone model of the upper jaw.

For details of the condylar assemblies 30, reference may be had to my co-pending application Serial No. 99,607, filed March 30, 1961. Otherwise the articulator shown for purposes of illustration is similar to that disclosed in my co-pending application Serial No. 62,190, filed October 12, 1960, now abandoned. It should be noted, however, that the instrument is provided with a series of interchangeable pairs of condyle discs, each pair of the series thereof having a different radius condyle path.

Referring particularly to FIG. 9, the face bow, generally designated 36, is a conventional face bow having a crossbar 38, rearwardly extending arms 40, auxiliary arms 42, condyle pins 44, and an axis orbital plane support 46. As illustrated in FIG. 9, the face bow 36 is carried by a clutch bar 45, which in turn is mounted upon a mounting post 47. Reference may be had to said application, Serial No. 62,190, for further details of the face bow 36 and for details of the post 47.

Referring particularly to FIGS. 1 and 2, a maxillary or upper jaw stone model, designated 48, is mounted upon a body of plaster 50. The teeth of the model are designated 52. Extending around the front of the model and along both sides thereof is a wax shim 54. The central cavity is filled with modeling clay or wet asbestos 56 to a level somewhat below the occlusal plane. Overlying the modeling clay 56 and the occlusal and incisal surfaces of the teeth is a sheet of self-curing plastic material (impression tray type) 58, which is turned down over the shim 54. A maxillary bearing plate 60 and a central bearing disc 62 are embedded in the plastic sheet 58 so that their upper surfaces are approximately coincident with the occlusal plane. Thus the plastic sheet 58 provides a maxillary clutch tray.

Referring particularly to FIGS. 4 and 5, a mandibular or lower stone model, designated 64, is mounted upon a body of plaster 66. The teeth of the model are designated 68. Extending around the front of the model and along both sides thereof is a wax shim 70. The central cavity is filled with modeling clay or wet asbestos 72 to a level somewhat below the occlusal plane. Overlying the modeling clay 72 and the occlusal and incisal surfaces of the teeth is a sheet of self-curing plastic material (impression tray type) 74, which is turned down over the shim 70. Set in an opening formed in the plastic sheet 74 is a mandibular bearing plate 76 provided with a fore and aft extending slot 78. A stylus 80 is projected through the slot 78 and is secured to the plate 76 by a pair of elements 82 threaded on the shank of the stylus and disposed respectively on opposite sides of the plate 76. Seated on the plate 76 is a spacer ring 84 with square-cut ends.

Referring particularly to FIG. 6, the undersurface of the central bearing disc 62 is shown provided with a straight protrusive registration 86, a right lateral registration 88, and a left lateral registration 90. Depressions drilled into the disc 62 are designated respectively by numerals 92, 94, 96, and 98.

Referring particularly to FIG. 7, a single extra-oral bite-relationship apparatus (five are required) includes a maxillary bite-relationship bar 100 and a mandibular bite-relationship bar 118. The bar 100 has opposite end portions 102 extending rearwardly and terminating in portions 104 turned downwardly and is slidably fitted with a split clamp element 106 which is drawn tight on the bar by means of a sleeve 108 accommodating a stud 110 which extends freely through the clamp 106 to take a finger nut 112. Extending through the sleeve 108 and the head of the stud 110 is the barrel 114 of a clutch bar which accommodates an element 116 provided with a threaded end. The clutch bar is releasably held fast by the sleeve 108, stud 110, and nut 112 and is adapted for being releasably secured to a stud attached to a clutch tray. The bar 118 is similar to the bar 110 and is similarly fitted with a split clamp element 106, sleeve 108, stud 110, nut 112 and clutch bar 114, 116.

Referring particularly to FIG. 13, an indicator, generally designated 120, comprises a sheet 122 of plastic material which is transparent. Printed upon the sheet 122 are lines 124 and 126 at right angles to each other and intersecting at 128. Adjacent an arcuate edge 129 of the sheet 122 are graduations, designated 130, dividing the angle included between the lines 124 and 126 into degrees in the manner of a protractor. Underlying the sheet 122 are a pair of indicator arms 132 and 134 also made of plastic sheet material that is transparent. Printed on the arm 132 is an index line 136, and printed on the arm 134 is an index line 138. Along the index line 136 are a group 140 of four dots at 4, 5, 6, and 7 millimeters from the pivot 128, and along the index line 138 are a group 142 of four dots 8, 10, 12, and 14 millimeters from the pivot point 128.

Referring to FIG. 14, a radius card 144 comprises a sheet of plastic material which is transparent. Printed on the card are a series of arcuate lines 146 each having a different radius, indicated on the card.

In the fabrication of artificial dentures, a preliminary step is the formation of clutch trays, which involves mounting the upper and lower stone models respectively upon the upper and lower sections of the articulator, as described in my co-pending application Serial No. 62,190, filed October 12, 1960.

Referring particularly to FIGS. 1 and 2, in forming the maxillary clutch tray, the wax shim 54 is applied to the model so that it extends around the front and along both sides of the model to cover the outer gum and teeth surfaces. Then the central cavity is filled in with modeling clay or wet asbestos 56, up to a level somewhat below the occlusal plane, whereupon the sheet of plastic 58 is laid over the model to cover the clay 56, the occlusal and incisal surfaces of the teeth, and the shim 54. The maxillary clutch bearing plate 60 and the central bearing disc 62 are now pressed into the plastic to such a depth that the surfaces thereof are approximately coincident with the occlusal plane. The plastic is then allowed to set.

Referring particularly to FIGS. 3 and 4, in forming the mandibular clutch tray, the wax shim 70 is applied to the model so that it extends around the front and along both sides of the model to cover the outer gum and teeth surfaces. Then the central cavity is filled with modeling clay or wet asbestos 72, up to a level somewhat below the occlusal plane. The mandibular clutch bearing plate 76 is now pressed into the modeling clay 72 to such a depth that the surface thereof is approximately coincident with the occlusal plane. Referring particularly to FIG. 3, the spacer ring 84 is now seated upon the plate 76 and the latter is pressed into parallelism with the maxillary clutch bearing plate 60 by closing the articulator in order to bring the maxillary clutch bearing plate 60 down firmly on the spacer ring 84. No further use is made of the spacer ring. Referring particularly to FIGS. 4 and 5, now the sheet of plastic 74 is laid over the model to cover the clay 72, the occlusal and incisal surfaces of the teeth, and the shim 70. An opening is provided in the plastic 74, which accommodates the plate 76. The edges of the opening lock the plate 76 in position. The plastic is then allowed to set. After the plastic has set, the clutch tray is removed from the model 64. The stylus 80 is now mounted upon the plate 76 and its height is suitably adjusted for registration of the point of the stylus with the central bearing disc 62. Then the clutch tray 74 is remounted upon its model 64.

The incisal pin 32 and the incisal guide 22 are now removed from the articulator, and the post 47 is mounted upon the lower section of the articulator. Using the post 47, clutch bars 45 are now detachably secured to the clutch trays 58 and 74 with plastic, as disclosed in my co-pending application Serial No. 62,190, filed October 12, 1960. Now the clutch bars 45 are detached from the clutch trays 58 and 74, the post 47 and clutch bars 45 are detached from the lower section of the articulator, the clutch bars 45 are detached from the post 47, and the clutch trays 58 and 74 are detached from the models and re-assembled with the clutch bars 45.

The clutch trays 58 and 74 are now cemented in the patient's mouth, and the center of rotation is located by using face bow 36. Then both sides of the patient's face are marked, all in well known manner.

Now the patient is directed to move from centric position to straight protrusive position, whereupon the stylus 80 scribes the excursion 86 on the central bearing disc 62. The patient is now directed to make similar excursions to the right and to the left, whereupon the stylus 80 scribes the excursions 88 and 90 on the disc 62. The central bearing disc 62 is now removed from the plate 60 and depressions 92, 94, 96, and 98 are drilled in the undersurface thereof with a small diameter drill. The depressions 92 and 94 are drilled on the registration 86 respectively 5 and 10 millimeters, for example, from the intersection of the registrations 86, 88, and 90, designated 99. The depression 96 is drilled on the registration 88, for example, 7 millimeters from the intersection 99, and the depression 98 is drilled on the registration 90, for example, 7 millimeters from the intersection 99. The disc is now replaced. The next step is to mount extra-oral bite-relationship apparatus on the clutch trays.

The patient is instructed to slide into straight protrusive until the stylus 80 registers with the depression 92 in the central bearing disc 62, whereupon the bars 100 and 118 are locked together at each end with a mass of stone, designated 119, as indicated in FIG. 8. This is done conveniently by filling a paper drinking cup 121 with stone and then embedding the hooked ends 104 of the bars in the stone. After the stone has set, the (5 mm.) bite-relationship apparatus, including the clutch bars, is removed as a unit and set aside. This procedure is now repeated with the stylus registering successively with depressions 94, 96, and 98. Lastly, the procedure is repeated with the patient in centric position. Each time the procedure is repeated, a fresh bite-relationship apparatus is used.

Now the maxillary clutch bar 45 is mounted upon the maxillary clutch tray 58, and the face bow is mounted thereon and adjusted to the two marks respectively on opposite sides of the patient's face. The axis orbital plane (not shown) is mounted upon the face bow, its support adjusted, and the third reference point marked on the patient's face. The axis orbital plane is then removed, the clutch bar is disconnected from the clutch tray, and the face bow and the clutch bar are removed as a unit. The clutch trays 58 and 74 are now removed from the patient's mouth, and the maxillary clutch tray 58 is re-assembled with its clutch bar. The next step is the procedure is to mount the clutch trays 58 and 74 upon the articulator.

The incisal pin 32 and incisal guide 22 are removed from the articulator, the post 47 is mounted upon the lower section of the articulator, and the upper section of the articulator in turn is mounted upon the face bow, as shown in FIG. 9, and as disclosed in my co-pending application Serial No. 62,190, filed October 12, 1960 now abandoned. The maxillary clutch tray 58 is now loaded with stone, designated 148, and the upper section of the articulator is swung forwardly and downwardly so that the fore end thereof bears upon the axis orbital plane support. The stone is allowed to set. Now the maxillary clutch tray 58 is detached from its clutch bar, the upper section of the articulator is detached from the face bow, and the post 47 is detached from the lower section of the articulator. Then the incisal pin 32 and incisal guide 22 are remounted upon the articulator. Now the terminal axis abutments of the condylar assemblies 30 are faced inwardly toward each other and the assemblies are shifted to the intercondylar distance of 55 millimeters. Then the metal condyle discs with ¾-inch radius paths, designated 152, which are used initially, are removed and plastic condyle discs with straight paths, designated 154, are substituted therefor and adjusted so that the paths extend forwardly and downwardly at an angle of approximately 45 degrees.

Referring particularly to FIG. 10, the instrument is now turned upside down and the centric extra-oral bite-relationship apparatus is mounted by securing its maxillary clutch bar to the maxillary clutch tray 58. Then the mandibular clutch tray 74 is mounted on the mandibular clutch bar of the apparatus, with the stylus 80 between the clutch trays. Now the mandibular clutch tray 74 is loaded with stone, designated 150, and the upper section of the articulator is swung forwardly and downwardly so that the incisal guide 22 rests upon the incisal pin 32. The stone is allowed to set. The next step in the procedure is to set the articulator.

At this point it should be noted that the position of the mandibular clutch tray 74 relative to the maxillary clutch tray 58 should be firmly held throughout the whole procedure. This is effectively accomplished by the centric extra-oral bite-relationship apparatus and the stylus 80, which coact to support the mandibular clutch tray 74 and secure it against rocking motion. Thus, the hands of the operator are not required to hold the mandibular clutch tray 74 firmly in position relative to the maxillary clutch tray 58, in consequence of which they are free for adjusting the instrument.

Referring particularly to FIG. 11, the instrument is turned right side up, and the condyle discs are adjusted so that the paths are at zero angulation (see FIG. 16). Then the incisal pin and centric extra-oral bite-relationship apparatus are removed. The straight protrusive (5 mm.) extra-oral bite-relationship apparatus is now mounted by securing its mandibular clutch bar to the mandibular clutch tray. The upper section of the articulator is now placed so that the stylus 80 registers with the depression 92 in the disc 62. Then the maxillary clutch bar is secured to the maxillary clutch stud, and the condyle path discs are adjusted as required to bring the condyle paths and the associated upright abutment surfaces into contact with the condyle heads. The change in angulation is noted (see FIG. 16). This procedure is repeated with the extreme (10 mm.) straight protrusive extra-oral bite-relationship apparatus. Again the change in angulation is noted. The next step in the procedure is to determine the radius of the condyle path.

Figure 12:
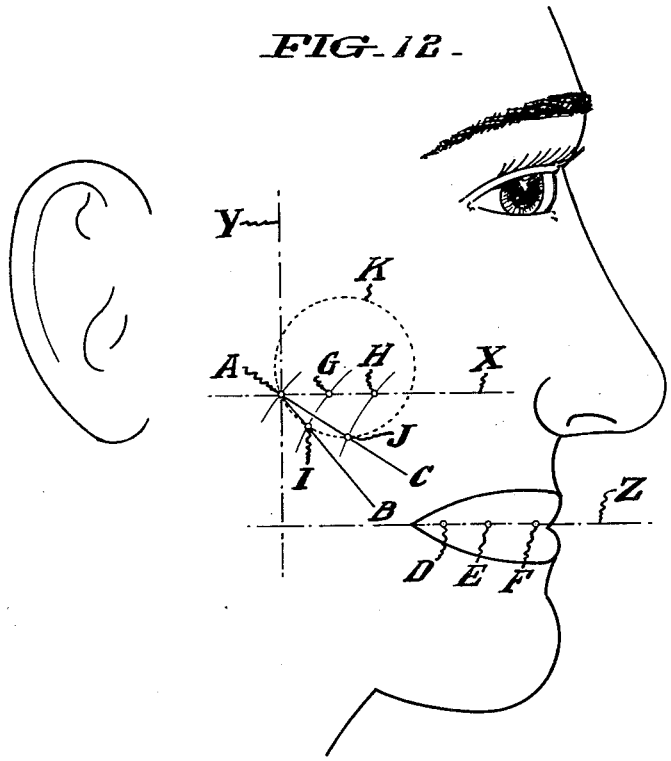
FIG. 12 is a diagram illustrating the use of certain data to determine the radius of the condyle path in the patient.

Referring particularly to FIG. 12, Y and X axes may be laid out on graph paper at right angles to each other. A line passing through the point of intersection, designated A, and normal to the paper represents the condyle axis in the patient. Then a line Z is drawn parallel to the X axis. The line Z represents a plane coincident with the undersurface of the disc 62 and is drawn a distance below the X axis approximating as nearly as possible the distance from said plane to the condylar axis in the patient. Now lines A–B and A–C are laid out at angles with the X axis corresponding to the changes in angulation or parameters previously noted, i.e., the changes in angulation which occurred between the upper and lower sections of the articulator when the intermediate (5 mm.) and extreme (10 mm.) straight protrusive extra-oral bite-relationship apparatus were used. Points D, E, and F are now laid out on line Z. The Y axis represents a vertical plane containing the condyle axis in the patient, and point D is located a distance from the Y axis approximating as nearly as possible the distance from said plane to the point 99 on the disc 62. The point E is located a distance of 5 mm. from the point D, and the point F is located a distance of 10 mm. from the point D. Points G and H are now laid out on the X axis, the point G is located a distance of 5 mm. from the point A, and the point H is located 10 mm. from the point A. With a radius corresponding to the distance between points A and D an arc is drawn through point G with its center at point E, thereby to locate a point I on line A–B. With the same radius, an arc is now drawn through the point H with its center at point F, thereby to locate a point J on line A–C. Now a circle, designated K, is drawn through the points A, I, and J. The radius of the circle K is the radius of the condyle path in the patient. In the event that the condyle path is straight, the lines A–B and A–C will coincide.

The plastic condyle discs with straight paths are now removed and plastic condyle discs with paths having the correct radius of curvature (not shown) are substituted therefor. If the articulator is provided with condyle discs having means for adjusting the radius of curvature of the condyle paths, as in my co-pending application Serial No. 856,425, filed December 1, 1959, instead of with a set of condyle discs each with a different radius condyle path, the adjustable condyle discs are adjusted to afford condyle paths having the correct radius of curvature.

The right and left lateral extra-oral bite-relationship apparatus are now mounted in the manner indicated hereinbefore in connection with the intermediate and extreme protrusive extra-oral bite-relationship apparatus. In each instance, the condyle assemblies are adjusted about horizontal and vertical axes and laterally relative to each other, as may be required, in order to bring the condyle paths and their associated upright abutment surfaces into contact with the condyle heads and to permit the clutch bars to be connected to the clutch trays without strain.

In lieu of the layout shown in FIG. 12 for determining the radius of the condyle path, the indicator and radius card illustrated in FIGS. 13, 14, and 15 may be used. The indicator arms 132 and 134 are moved to positions so that the angle included between the lines 124 and 136 and the angle included between the lines 124 and 138 correspond respectively to the changes in angulation or parameters previously noted, i.e., the changes in angulation which occurred between the upper and lower sections of the articulator when the intermediate (5 mm.) and extreme (10 mm.) straight protrusive extra-oral bite-relationship apparatus were used. Now the radius card 144 is laid over the indicator and shifted about until one of the arcs thereon passes through the pivot point 128, the 5 mm. mark of the group of marks 140 and the 10 mm. mark of the group of marks 142. Thus, assuming the angles or parameters aforesaid to be 35 and 25 degrees respectively, the radius of curvature of the condyle paths in the patient is $7/16$ of an inch. If these parameters are the same, the condyle path is straight. As noted above, the indicator 120 and card 144 may be used in lieu of the layout of FIG. 12. However, each of these procedures yields results that are in fact accurate enough for all practical purposes, as evidenced by the fact that the results check with pantograph tracings.

It will be understood, of course, that the present invention, as described and shown, is susceptible to various changes and modifications which may be made without any departure from the general principles or real spirit of the invention. Accordingly, it is intended to claim the present invention broadly, as well as specifically, as indicated in the appended claims.

Having thus described my invention, I claim as follows:

1. In apparatus for use in dental prosthesis, the combination comprising a pair of clutch bars for being detachably connected respectively to a pair of clutch trays and for extending from the patient's mouth outwardly between the patient's lips, a pair of rods mounted respectively upon said clutch bars for extending across the patient's face externally thereof, means extending laterally respectively from said rods, and a mass of material having corresponding ones of said laterally extending means embedded therein for locking each of said rods and its associated clutch bar to the other of said rods and its associated clutch bar.

2. In apparatus for use in dental prosthesis, the combination comprising a pair of clutch bars for being detachably connected respectively to a pair of clutch trays and for extending from the patient's mouth outwardly between the patient's lips, a pair of rods mounted respectively upon said clutch bars for extending across the patient's face externally thereof, each of said rods having laterally extending opposite end portions, corresponding end portions respectively of said rods being disposed proximate each other, and masses of stone each having a pair of said corresponding end portions embedded therein for locking each of said rods and its associated clutch bar to the other of said rods and its associated clutch bar.

3. In apparatus for use in dental prosthesis, the combination comprising a pair of clutch trays, coacting registration means including a plate carried by one of said trays, a disc removably non-turnably set in said plate, and a stylus carried by the other of said trays for engagement with said disc, and means detachably connected to said trays and locking the same in a predetermined fixed position relative to each other, said locking means being adapted, when said trays are operatively positioned in the patient's mouth, to extend from said trays outwardly between the patient's lips, and to be positioned, substantially in its entirety, externally of the patient's mouth.

4. In apparatus for use in dental prosthesis, the combination comprising maxillary and mandibular clutch trays, coacting registration means including a plate carried by said maxillary clutch tray, a disc removably non-turnably set in said plate, a plate carried by said mandibular clutch tray, and a stylus carried by the last mentioned plate for engagement with said disc and mounted for being selectively positioned longitudinally of said trays, and means detachably connected to said trays and locking the same in a predetermined fixed position relative to each other, said locking means being adapted, when said trays are operatively positioned in the patient's mouth, to extend from said trays outwardly between the patient's lips, and to be positioned, substantially in its entirety, externally of the patient's mouth.

5. In apparatus for use in dental prosthesis, the combination comprising a pair of clutch trays, coacting registration means including a first plate carried by one of said trays, a second plate carried by the other of said trays, and a stylus carried by said second plate for engagement with said first plate, means removably interposed between said plates for positioning the same in parallelism, and means detachably connected to said trays and locking the same in a predetermined fixed position relative to each other, said locking means being adapted, when said trays are operatively positioned in the patient's mouth, to extend from said trays outwardly between the patient's lips, and to be positioned substantially in its entirety, externally of the patient's mouth.

6. The method of ascertaining certain parameters for use in determining the curvature of the condyle paths in human beings comprising fitting the patient with clutch trays, with the patient's jaw in centric position applying a pair of clutch bars respectively to said clutch trays and locking the same against movement relative to each other, detaching said first pair of clutch bars from said clutch trays and setting the same aside, with the patient's jaw in a predetermined intermediate straight protrusive position applying another pair of clutch bars respectively to said clutch trays and locking the same against movement relative to each other, detaching said second pair of clutch bars from said clutch trays and setting the same aside, with the patient in a predetermined extreme straight protrusive position applying still another pair of clutch bars respectively to said clutch trays and locking the same against movement relative to each other, detaching said third pair of clutch bars from said clutch trays and setting the same aside, removing the clutch trays from the patient's mouth and mounting them in a dental articulator having upper and lower bow members using said first mentioned pair of clutch bars to position said trays relative to each other, said articulator being provided with discs having surfaces simulating condyle paths and rockable about horizontal axes, elements underlying said discs and simulating condyle heads, and means for visually indicating the change in angulation when said discs are turned about their axes, positioning the bow members of said articulator relative to each other using one of the remaining two pairs of clutch bars, bringing the condyle paths into engagement with the condyle heads to indicate a first parameter by the change in angulation of the visual indicating means, positioning the bow members of said articulator relative to each other using the other of the remaining two pairs of clutch bars, and bringing the condyle paths into engagement once again with the condyle heads to indicate a second parameter by the second change in angulation of the visual indicating means.

7. The method defined in claim 6 wherein locking of the clutch bars relative to each other is effected entirely by means outside the patient's mouth.

References Cited in the file of this patent
UNITED STATES PATENTS
2,334,898    Bigger et al. _____ Nov. 23, 1943